(12) United States Patent
Li et al.

(10) Patent No.: US 9,253,721 B2
(45) Date of Patent: Feb. 2, 2016

(54) ACTIVATION OF SUPPLEMENTARY TRANSMISSION UNIT

(71) Applicant: FUJITSU LIMITED, Kawasaki-shi, Kanagawa (JP)

(72) Inventors: Zhaojun Li, Guildford Surrey (GB); Paul Bucknell, Brighton (GB); Timothy Moulsley, Caterham Surrey (GB)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 14/136,077

(22) Filed: Dec. 20, 2013

(65) Prior Publication Data

US 2014/0105056 A1    Apr. 17, 2014

Related U.S. Application Data

(63) Continuation of application No. PCT/EP2011/066938, filed on Sep. 28, 2011.

(51) Int. Cl.
| | |
|---|---|
| *H04B 7/00* | (2006.01) |
| *H04W 52/02* | (2009.01) |
| *H04W 24/02* | (2009.01) |
| *H04W 24/08* | (2009.01) |

(Continued)

(52) U.S. Cl.
CPC .......... *H04W 52/0203* (2013.01); *H04W 24/02* (2013.01); *H04W 24/08* (2013.01); *H04W 52/0206* (2013.01); *H04W 16/26* (2013.01); *H04W 84/045* (2013.01); *H04W 84/047* (2013.01)

(58) Field of Classification Search
CPC .. H04W 76/02; H04W 76/025; H04W 76/028
USPC ................................... 370/310, 315, 328, 329
See application file for complete search history.

(56) References Cited

U.S. PATENT DOCUMENTS

| 5,893,036 A | 4/1999 | Trandai et al. |
|---|---|---|
| 6,246,867 B1 | 6/2001 | Jakobsson |
| 6,622,251 B1 | 9/2003 | Lindskog et al. |

(Continued)

FOREIGN PATENT DOCUMENTS

| EP | 1146653 | 10/2001 |
|---|---|---|
| EP | 1370010 | 12/2003 |

(Continued)

OTHER PUBLICATIONS

International search report and written opinion issued for corresponding International Application No. PCT/EP2011/066938, mailed Jun. 8, 2012.

(Continued)

*Primary Examiner* — Dmitry H Levitan
(74) *Attorney, Agent, or Firm* — Myers Wolin, LLC (57) ABSTRACT

A telecommunications method in a wireless communication network comprising a base station, a supplementary transmission unit and one or more user equipments, the supplementary transmission unit being initially in a dormant state in which it does not transmit; wherein based on the configuration from the base station the supplementary transmission unit measures a parameter of uplink transmission from the user equipment towards the base station; and a decision is made as to whether to activate the supplementary transmission unit in dependence upon the measured parameter.

15 Claims, 4 Drawing Sheets

(51) Int. Cl.
*H04W 16/26* (2009.01)
*H04W 84/04* (2009.01)

(56) References Cited

U.S. PATENT DOCUMENTS

| | | | |
|---|---|---|---|
| 6,810,019 | B2 | 10/2004 | Steudle |
| 6,996,392 | B2 | 2/2006 | Anderson et al. |
| 7,035,676 | B2 | 4/2006 | Ranta |
| 7,043,751 | B1 | 5/2006 | Fischer et al. |
| 7,065,371 | B1 | 6/2006 | Kleinerman |
| 7,372,894 | B2 | 5/2008 | Rached et al. |
| 7,746,915 | B1 | 6/2010 | Herrmann et al. |
| 7,783,299 | B2 | 8/2010 | Anderson et al. |
| 8,351,960 | B2 * | 1/2013 | Lister .......................... 455/456.5 |
| 8,401,463 | B2 | 3/2013 | Nakamura |
| 8,675,588 | B2 | 3/2014 | Fujishima et al. |
| 8,787,843 | B2 * | 7/2014 | Dottling et al. ................. 455/73 |
| 9,030,941 | B2 * | 5/2015 | Michel et al. ................. 370/241 |
| 2002/0111183 | A1 | 8/2002 | Lundby |
| 2002/0160781 | A1 | 10/2002 | Bark et al. |
| 2003/0228871 | A1 | 12/2003 | Bernhard et al. |
| 2004/0179578 | A1 | 9/2004 | Ben Rached et al. |
| 2004/0203429 | A1 | 10/2004 | Anderson et al. |
| 2004/0266339 | A1 | 12/2004 | Larsson |
| 2005/0048914 | A1 | 3/2005 | Sartori et al. |
| 2008/0108369 | A1 | 5/2008 | Visotsky et al. |
| 2008/0233960 | A1 | 9/2008 | Kangude et al. |
| 2009/0154404 | A1 | 6/2009 | Abeta et al. |
| 2010/0113055 | A1 | 5/2010 | Iwamura et al. |
| 2010/0210255 | A1 | 8/2010 | Amirijoo et al. |
| 2010/0260148 | A1 | 10/2010 | Huoviala et al. |
| 2011/0053602 | A1 | 3/2011 | Moberg et al. |
| 2011/0076964 | A1 * | 3/2011 | Dottling et al. ................. 455/68 |
| 2011/0081856 | A1 | 4/2011 | Johansson et al. |
| 2011/0128865 | A1 | 6/2011 | Doppler et al. |
| 2011/0194429 | A1 | 8/2011 | McWilliams et al. |
| 2011/0194493 | A1 * | 8/2011 | Centonza et al. ............. 370/328 |
| 2013/0189932 | A1 * | 7/2013 | Shen et al. ...................... 455/68 |

FOREIGN PATENT DOCUMENTS

| | | |
|---|---|---|
| EP | 1971040 | 9/2008 |
| EP | 1238545 | 2/2009 |
| EP | 2056538 | 5/2009 |
| EP | 2129161 | 12/2009 |
| EP | 2154921 | 2/2010 |
| EP | 1169818 | 5/2011 |
| EP | 2323449 | 5/2011 |
| JP | 2009-246508 A | 10/2009 |
| WO | 98/10530 | 3/1998 |
| WO | 01/03324 | 1/2001 |
| WO | 02/065663 | 8/2002 |
| WO | 02/067606 | 8/2002 |
| WO | 2007/052752 A1 | 5/2007 |
| WO | 2009/076995 | 6/2009 |
| WO | 2009/157861 | 12/2009 |
| WO | 2010/018158 | 2/2010 |
| WO | 2010/093306 | 8/2010 |
| WO | 2010/104433 | 9/2010 |
| WO | 2010/150417 A1 | 12/2010 |
| WO | 2011/064696 | 6/2011 |

OTHER PUBLICATIONS

Notice of Preliminary Rejection issued for corresponding Korean Patent Application No. 10-2014-7000407, mailed on Mar. 12, 2015, with English translation.
3GPP TR 36.927 V10.0.0, "3rd Generation Partnership Project; Technical Specification Group Radio Access Network; Evolved Universal Terrestrial Radio Access (E-UTRA); Potential solutions for energy saving for E-UTRAN (Release 10)", Jun. 2011.
ETSI TS 136 422 V8.2.0; LTE; Evolved Universal Terrestrial Radio Access Network (E-UTRAN); "X2 signalling transport (3GPP TS 36.422 version 8.2.0 Release 8)"; Nov. 2008.
ETSI TS 136 211 V8.7.0; LTE; Evolved Universal Terrestrial Radio Access (E-UTRA); "Physical channels and modulation (3GPP TS 36.211 version 8.7.0 Release 8)"; Jun. 2009.
ETSI TS 136 321 V8.7.0; LTE; Evolved Universal Terrestrial Radio Access (E-UTRA); "Medium Access Control (MAC) protocol specification (3GPP TS 36.321 version 8.7.0 Release 8)"; Sep. 2009.
ETSI TS 136 300 V8.12.0; LTE; Evolved Universal Terrestrial Radio Access (E-UTRA) and Evolved Universal Terrestrial Radio Access Network (E-UTRAN); "Overall description; Stage 2 (3GPP TS 36.300 version 8.12.0 Release 8)"; Apr. 2010.
ETSI TS 136 331 V10.0.0; LTE; Evolved Universal Terrestrial Radio Access (E-UTRA); Radio Resource Control (RRC); "Protocol specification (3GPP TS 36.331 version 10.0.0 Release 10)"; Jan. 2011.
ETSI TS 136 423 V10.1.0; LTE; Evolved Universal Terrestrial Radio Access Network (E-UTRAN); "X2 Application Protocol (X2AP) (3GPP TS 36.423 version 10.1.0 Release 10)"; Apr. 2011.
Notification of Reason(s) for Rejection issued for corresponding Japanese Patent Application No. 2014-532253 mailed Sep. 1, 2015 with an English translation.

* cited by examiner

FIG. 7

ACTIVATION OF SUPPLEMENTARY TRANSMISSION UNIT

CROSS-REFERENCE TO RELATED APPLICATION

This application is a continuation of Application PCT/EP2011/066938, filed on Sep. 28, 2011, now pending, the contents of which are herein wholly incorporated by reference.

The present invention relates to a telecommunications method in a wireless communication network comprising a base station, a supplementary transmission unit and one or more user equipments. The invention also relates to the network, base station, supplementary transmission unit and user equipment for use in said method.

Particularly, but not exclusively, the present invention relates to uplink communication procedures in accordance with the LTE (Long Term Evolution) and LTE-Advanced radio technology standards as, for example, described in the 36-series (in particular, specification documents 3GPP TS 36.xxx and documents related thereto), releases 9, 10 and subsequent of the 3GPP specifications series. However, the present invention is also applicable to UMTS, WiMAX and other communication systems, in which there is a base transmission station, supplementary transmission unit and one or more user equipments (also referred to as a "subscriber station", "user terminal", "UE" or "mobile terminal").

Wireless communication systems are widely known in which base stations (BSs) form "cells" and communicate within range of the BSs. In LTE for example, the base stations are generally called eNodeBs and the subscriber stations are called user equipments or UEs.

In such a system, each BS divides its available bandwidth, i.e. frequency and time resources in a given cell, into individual resource allocations for the user equipments which it serves. The user equipments are generally mobile and therefore may move among the cells, prompting a need for handovers of radio communication links between the base stations of adjacent cells. A user equipment may be in range of (i.e. able to detect signals from) several cells at the same time, but in the simplest case it communicates with one "serving" or "primary" cell.

Each BS can provide more than one cell and these cells may be activated and deactivated individually. That is, a cell may be dormant, in which case it may transmit and receive signals over backhaul connections and possibly also receive wireless signals, but does not transmit over the wireless network. When the cell is activated by the BS, its transmission capability is effectively switched on. Cells may be dormant for energy saving purposes or if their capacity is not required or for any other reason, such as cost saving or maintenance. 3GPP TS 36.423 refers in section 8.3 to cell activation in an LTE network.

A wireless communication system, and the cells within it, may be in FDD (Frequency Division Duplex) or TDD (Time Division Duplex) mode. Resources in the system have both a frequency dimension, divided in units of subcarriers, and a time dimension having units of a symbol time or "slot". The UEs are allocated, by a scheduling function at the eNodeB, a specific number of subcarriers for a predetermined amount of time. Resources are allocated to UEs both for downlink and uplink transmission, although uplink allocation is of most relevance to the invention to be described.

The uplink in an LTE wireless communication system employs a variant of OFDMA called Single-Carrier FDMA (SC-FDMA). Essentially, SC-FDMA is a linearly precoded OFDMA scheme, involving an additional DFT step before OFDMA processing. Access to the uplink by multiple UEs is enabled by assigning to each UE a distinct set of non-overlapping sub-carriers. Hereby also incorporated by reference is also 3GPP TS 36.300 providing an overall description of the radio interference protocol architecture used in LTE-based systems and in particular section 4.2 of 3GPP TS 36.300 relating to uplink transmission schemes.

In LTE, several channels for data and control signalling are defined at various levels of abstraction within the system.

Figure 1:
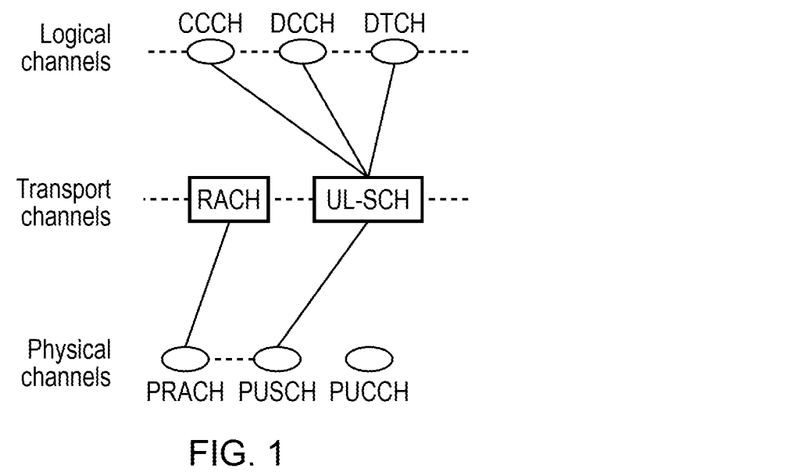
FIG. 1 shows a diagrammatic representation of LTE uplink channels.

FIG. 1 shows some of the uplink channels defined in LTE at each of a logical level, transport layer level and physical layer level, and the mappings between them. User data and also some signalling data is carried on the Physical Uplink Shared Channel (PUSCH). By means of frequency hopping on PUSCH, frequency diversity effects can be exploited and interference averaged out. The control channels include a Physical Uplink Control Channel, PUCCH, used to carry signalling from UEs including channel state information (CSI), as represented for example by channel quality indication (CQI) reports, and scheduling requests. There is also a Physical Random Access Control Channel, PRACH with at the transport layer level, a corresponding Random Access Channel, RACH. In addition to the above channels, uplink resources are also allocated to reference signals, in particular a Sounding Reference Signal SRS.

The Physical Random Access Channel PRACH is used to carry the Random Access Channel (RACH) for assessing the network if the UE does not have any allocated uplink transmission resource. If a scheduling request (SR) is triggered at the UE, for example by arrival of data for transmission of PUSCH, when no PUSCH resources have been allocated to the UE, the SR is transmitted on a dedicated resource for this purpose. If no such resources have been allocated to the UE, the RACH procedure is initiated. The transmission of SR is effectively a request for uplink radio resource on the PUSCH for data transmission.

Thus, RACH is provided to enable UEs to transmit signals in the uplink without having any dedicated resources available, such that more than one terminal can transmit in the same resources simultaneously. The term "Random Access" is used because the identity of the UE (or UEs) using the resources at any given time is not known in advance by the network (incidentally, in this specification the terms "system" and "network" are used interchangeably). RACH can be used by the UEs in either of contention-based and contention-free modes.

Basic LTE Network Topology

Figure 2:
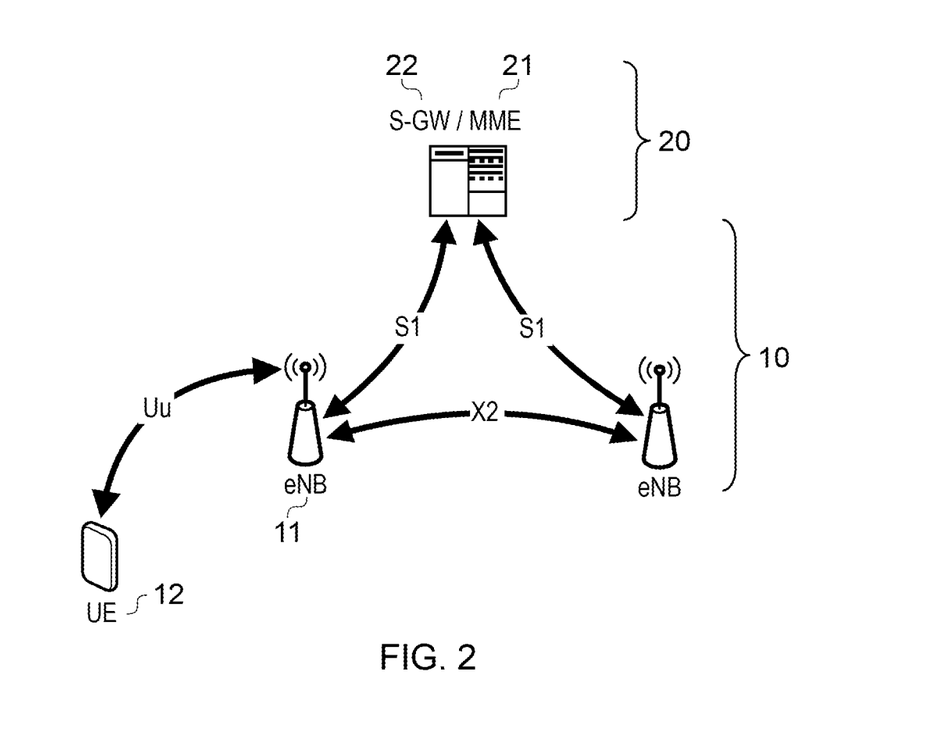
FIG. 2 is a schematic representation of an LTE network.

The network topology in LTE is illustrated in FIG. 2. As can be seen, each UE 12 connects over a wireless link via a Uu interface to an eNB 11. The network of eNBs is referred to as the eUTRAN 10.

Each eNB 11 in turn is connected by a (usually) fixed link using an interface called S1 to higher level or "core network" entities, including a Serving Gateway (S-GW 22), and a Mobility Management Entity (MME 21) for managing the system and sending control signalling to other nodes, particularly eNBs, in the network. In addition, a PDN or Packet Data Network Gateway (P-GW) is present, separately or combined with the S-GW 22, to exchange data packets with any packet data network including the Internet. The core network 20 is called the EPC or Evolved Packet Core.

The eNBs may be interconnected with each other by means of a X2 interface. The eNBs are connected by means of a S1 interface to the EPC, more specifically to the MME by means of a S1-MME and to the S-GW by means of a S1-U. The S1 interface supports a many-to-many relation between MMEs/Serving Gateways and eNBs.

Further details of the E-UTRAN radio interface protocol architecture are described, for example, in 3GPP TR 36.300; the disclosure thereof being hereby incorporated by reference in the present application.

The X2 may be a logical interface between two eNBs. Whilst logically representing a point to point link between eNBs, the physical realization needs not be a point to point link. The X2 interface is described in more detail, for example, in specification series 3GPP TS 36.42x; the disclosure thereof being hereby incorporated by reference in the present application.

In LTE and other advanced wireless communication networks, supplementary transmission units may be provided in addition to a base station. For example, there may be cells providing basic coverage in the area and capacity-boosters cells which are used when the traffic load is high and dormant when the traffic load is low. These capacity-booster cells could be provided by extra base stations which would usually have a lower coverage area than other base stations in the network, such as micro-, pico- or nano-base stations (providing micro-, pico- or nano-cells). Alternatively, the cells may be provided by stationary or mobile relay stations. As a further possibility, the same concept of dormancy applies in a base station including a baseband unit (BBU) and multiple remote radio heads (RRHs). The RRHs may have a combined effect to form one or more cells for the BBU, or each RRH may provide a separate cell. In this scenario the controlling baseband unit can individually configure the remote radio heads statically or dynamically to cease transmission in certain circumstances and thus become dormant.

In all these scenarios it can be important to have a methodology for reactivating a dormant supplementary transmission unit. More generally speaking, it is desirable to provide a way of controlling transmission activity by network stations in a wireless communication network.

STATEMENTS OF INVENTION

The invention is defined in the independent claims, to which reference should now be made. Advantageous embodiments are set out in the sub claims.

According to an embodiment of a first aspect of the invention there is provided a telecommunications method in a wireless communication network comprising a base station, a supplementary transmission unit and one or more user equipments, the supplementary transmission unit being initially in a dormant state in which it does not transmit; wherein based on a configuration from the base station, the supplementary transmission unit measures a parameter of uplink transmission from the user equipment towards the base station; and a decision is made as to whether to activate the supplementary transmission unit in dependence upon the measured value of the parameter.

Thus in preferred embodiments, based on the configuration from the base station, the supplementary transmission unit carries out a measurement of uplink transmission and there is a subsequent decision as to whether the supplementary transmission unit should be activated. This method has the possible advantage that it can identify uplink transmission which may not even reach the main base station but without needing to activate the supplementary transmission unit in advance. Another possible advantage is the detection of the uplink transmission load towards the main base station which could be handled by the supplementary transmission unit if activated, for capacity boosting. The supplementary transmission unit may be a supplementary station, or supplementary base station, or another unit. In any of these cases it can receive, and transmits as a supplemental transmission.

The parameter could be any parameter useful for monitoring uplink transmission, and is likely to be received power (in watts or dBm for example) in most invention embodiments. The measurement may be of more than one parameter or there may be a sequence of measurements. Moreover, additional information may be monitored, such as the frequency band, type of signal detected, device identity and/or measurement timing.

The decision as to whether to activate supplementary transmission unit may be made in the unit itself, at the base station or potentially also by some other network entity. In one embodiment, the decision as to whether to activate the supplementary transmission unit is made in the supplementary transmission unit and is based on a threshold of the parameter. Measurement of more than one parameter or a sequence of measurements may require more than one threshold. For example the threshold may take into account developments over time or hysteresis effects In other embodiments, the supplementary transmission unit transmits an indication of the measured parameter at the supplementary transmission unit to the base station; and the decision as to whether to activate the supplementary transmission unit is made in the base station. Any additional information may also be transmitted. In such embodiments, the base station has more control of supplementary transmission unit reactivation. These embodiments are for example appropriate for the scenario of a baseband unit with remote radio heads, since the remote radio heads themselves are likely to be in a simple master-slave relationship with the baseband unit. The indication can be sent over a fixed connection provided for communication between the BBU and the RRH. In embodiments with basic coverage and capacity booster cells, transmission of the indication and other communication between the base station and booster station is over the X2 interface.

One advantage of transmission of the indication (which may be transmission of the measurement itself or of some signal derived from the measurement) is that other factors can be taken into account for the decision as to whether to activate the supplementary transmission unit. Such factors may include traffic load in the area, the speed of the UE, or the requested service from the UE.

A threshold may be applied to the parameter either in the supplementary transmission unit (for example to provide the indication) or in the base station or there may be no specific threshold for the measured parameter alone.

The indication may be transmitted to the base station in all circumstances. Alternatively, the indication may be transmitted only if the measured transmission satisfies at least one precondition. In one preferred embodiment, the precondition is a minimum value of the measured parameter.

The decision as to whether to activate the supplementary transmission unit may be made in dependence upon receipt of the uplink transmission by the base station. In some circumstances although the indication has been received, the uplink transmission itself may not be received. In this case, on the assumption that the UE in question does not have sufficient power to transmit to the base station or is too far from the base station, the base station may simply activate the supplementary transmission unit or activate it after a delay.

Equally, in these circumstances the supplementary transmission unit may activate itself (without BS signalling to do so) if it does not receive any response to the indication after a certain period. This lack of response would thus indicate that the active BS has not received the UE uplink transmission and that the supplementary transmission unit should proceed to activation.

If the UE uplink transmission is received at the base station, the decision as to whether to activate supplementary transmission unit may be made based on various factors. Preferably, if user equipment uplink transmission corresponding to the measured parameter at the supplementary transmission unit is received at the base station, the decision as to whether to activate the supplementary transmission unit is made on the basis of a comparison between the indication and the same parameter of user equipment uplink transmission, but measured at the base station. Other factors may be taken into account, as previously noted.

The user equipment uplink transmission which is measured according to the present invention may be any suitable uplink transmission from the UE. In particular, it may be appropriate to monitor for a UE attempting to access the network. This might be an indication that a UE has been unable to access the base station, for reasons of low power for example. Thus in one embodiment the user equipment transmission is transmission as part of an access procedure to access the network. In some preferred embodiments, the uplink transmission is of a predefined access signal reserved for certain user devices, preferably of a random access preamble designated for use by low power devices and/or transmitted in resources designated for use by low power devices. Such a predefined access signal (such as the RACH signal in LTE) may be transmitted in a predefined random access channel. If a particular random access channel has been designated for certain devices, such as low power devices, this may be chosen from a special group of preambles. Alternatively or additionally the preamble may be transmitted at a time/frequency reserved for such devices.

In an alternative embodiment, the user equipment transmission may be transmission for measuring the uplink channel from the user equipment to the base station, or transmission of uplink control information or uplink data transmission. For example, the UE transmission may be a sounding reference signal, or control or data transmission on PUCCH/PUSCH resources in LTE embodiments. Of course embodiments in which a plurality of types of uplink transmission are measured also fall within the scope of the present invention.

Advantageously, the invention can also be applied in networks in which there is more than one supplementary transmission unit which is dormant and can be activated. Thus according to some invention embodiments, the network includes more than one supplementary transmission unit, and the base station selects a supplementary transmission unit to activate based on the indications from the different supplementary transmission units. If multiple dormant cells overlap with the active cell, the BS can decide which supplementary transmission unit to activate depending on not only the indication, but also the particular capability of the dormant transmission units, requested services from the UE etc.

The method may be initiated in any suitable way, based on a configuration from the base station whenever the method is applied. Thus there may be a static configuration (for example provided during network setup) which instructs the supplementary transmission unit to monitor particular uplink transmissions. Alternatively the configuration may be dynamic, for example an instruction sent from the base station whenever the method is to be applied. In one embodiment the base station requests the dormant supplementary transmission unit to carry out the measurement of user equipment uplink transmission at the start of the method; and preferably the base station request includes information related to uplink transmission settings in the cell provided by the base station. The information related to uplink transmission settings may include for example the initial power of an uplink transmission within the cell in question and/or the power ramping factor and/or any special signals which are to be monitored (for example particular preambles) and/or the resources allocated for such uplink transmission. The request may also include a threshold for sending the indication to the base station (for example a received power threshold). Any combination of this information may be provided.

In this context the term "cell" implies a given geographical coverage area. Additionally, "cell" can also refer to the particular station which provides the coverage area, and/or the relevant characteristics such carrier frequency which are used.

In one preferred embodiment the base station is a base station providing a coverage cell and the supplementary transmission unit is a booster base station providing a booster cell overlapping with the coverage cell when activated, or a relay station, providing a relaying cell overlapping with the coverage cell when activated (so that the UE is within the overlap and can potentially receive transmissions in both cells). In this context the term "cell" implies a given geographical coverage area. Additionally "cell" can also refer to the particular station which provides the coverage area, and/ or the relevant characteristics, such carrier frequency, which are used. Thus the booster base station may be a BS providing a pico cell and in this case the coverage cell provided by the base station may be referred to as a macro cell. The relaying cell or booster cell may be completely within the coverage cell or extend the area of the coverage cell, but some overlap is always present.

Alternatively in some embodiments the base station is a baseband unit with at least one remote radio head in receive and transmit mode and the supplementary transmission unit is a remote radio head of the base band unit which is in receive-only mode when dormant. In such embodiments, the remote radio head in receive-only mode is likely to be preconfigured for at least periodic monitoring of uplink transmission.

For the avoidance of doubt therefore, the present invention extends to a telecommunications method in a wireless communication network comprising a base station made up of a baseband unit (BBU) and a plurality of remote radio heads (RRHs) in which at least one remote radio head is initially in a dormant state in which it does not transmit; wherein based on a configuration from the baseband unit, the dormant remote radio head measures a parameter of uplink transmission from the user equipment towards the base station; and a decision is made as to whether to activate the remote radio head in dependence upon the measured parameter. The decision is preferably made in the base band unit, because this is where the control functionality of this arrangement lies.

According to an embodiment of a second aspect of the invention there is provided a wireless communication network comprising a base station, a supplementary transmission unit and one or more user equipments, the supplementary transmission unit having a dormant state in which it does not transmit; wherein the supplementary transmission unit is operable in dormant mode to measure a parameter of uplink transmission from the user equipment towards the base station; and a controller is operable to make a decision whether to activate the supplementary transmission unit in dependence upon the measured parameter. The controller may be provided as part of the supplementary transmission unit or as part of the base station.

According to an embodiment of a third aspect of the invention there is provided a base station in a wireless communication network comprising the base station, a supplementary transmission unit and one or more user equipments, the supplementary transmission unit having a dormant state in which it does not transmit but can measure a parameter of uplink transmission from the user equipment towards the base station; wherein the base station is operable to receive an indication of the measured parameter from the supplementary transmission unit; and to decide whether to activate the supplementary transmission unit. Thus the base station will include a transmitter/receiver and a controller.

According to an embodiment of a fourth aspect of the invention there is provided a supplementary transmission unit in a wireless communication network comprising a base station, the supplementary transmission unit and one or more user equipments, the supplementary transmission unit having a dormant state in which it does not transmit; wherein the supplementary transmission unit is operable in dormant mode to measure a parameter of uplink transmission from the user equipment towards the base station. The unit thus includes a measurement function.

According to an embodiment of a fifth aspect of the invention there is provided a user equipment in a wireless communication network comprising a base station, a supplementary transmission unit and one or more user equipments, the supplementary transmission unit having a dormant state in which it does not transmit; wherein the user equipment is configured to transmit uplink towards the base station using transmission resources and/or a signal which distinguishes it from user equipments of another class of device.

According to a further aspect of the present invention, there is provided a computer program/computer-readable instructions which, when executed by one or more processors of a wireless communications network carry out any of the methods as variously described hereinbefore. Such instructions may be stored on one or more non-transitory computer-readable media or downloaded as a signal.

In general, and unless there is a clear intention to the contrary, features and sub-features described with respect to one aspect of the invention may be applied equally and in any combination to any other aspect, even if such a combination is not explicitly mentioned or described herein.

As is evident from the foregoing, the present invention involves signal transmissions between base stations, supplementary transmission units and user equipments in a wireless communication system. A base station/supplementary transmission unit referred to here may take any form suitable for transmitting and receiving such signals. For the purpose of visualising the invention, it may be convenient to imagine the UE as a mobile handset but no limitation whatsoever is to be implied from this. In preferred embodiments of the present invention the base stations and supplementary transmission units may take the form proposed for implementation in the 3GPP LTE and 3GPP LTE-A groups of standards, and may therefore be described as an eNodeBs (eNBs) (which term also embraces Home eNodeB or HeNB) as appropriate in different situations. However, subject to the functional requirements of the invention, some or all base stations may take any other form suitable for transmitting and receiving signals.

BRIEF DESCRIPTION OF THE DRAWINGS

Reference is made, by way of example only, to the accompanying drawings in which.

Figure 3:
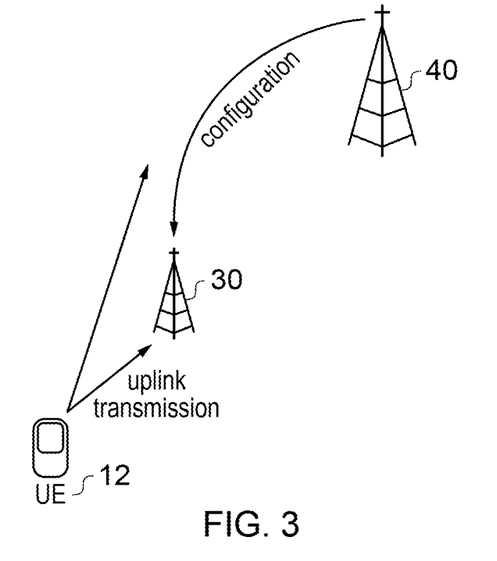
FIG. 3 is a schematic diagram of a network according to invention embodiments.

FIG. 3 shows the basic components of an invention embodiment in which the supplementary transmission unit is a transmitting station in its own right. UE 12 transmits uplink towards base station 40 and the transmission reaches the supplementary transmission unit 30. The supplementary transmission unit 30 has been configured (either before implementation or during network operation) by base station 40 to measure a parameter of the uplink transmission. A decision is made as to whether to activate the supplementary transmission unit in dependence upon receipt of the uplink transmission at the supplementary transmission unit.

Figure 4:
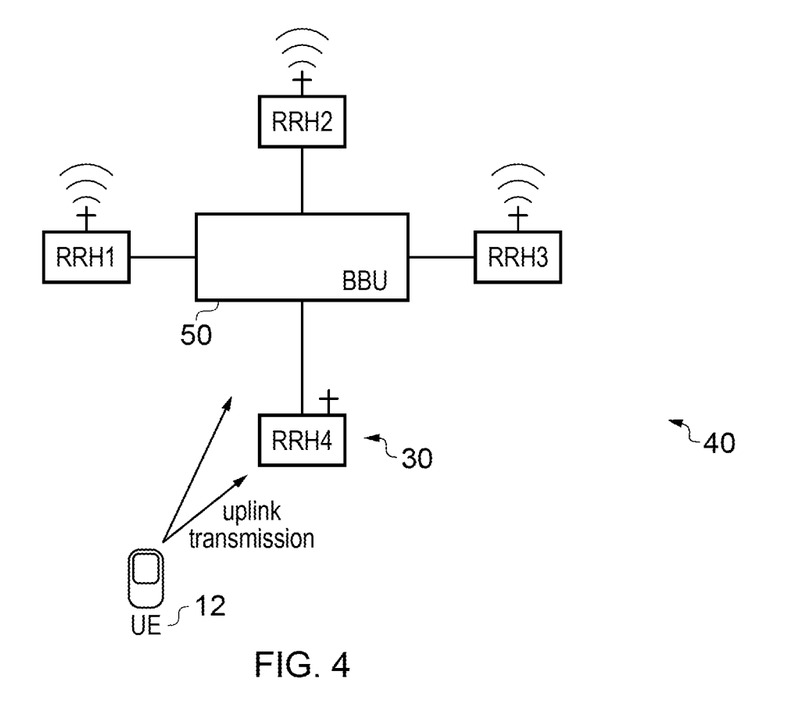
FIG. 4 is a schematic diagram of an RRH embodiment of invention embodiments.

FIG. 4 shows an alternative embodiment in which a baseband unit 50 controls multiple remote radio heads (RRH). Thus the base station is made up of the baseband unit and various remote radio heads, which may be connected to the BBU by optical fibres, as an example. Each RRH may contain at least RF circuitry for transmission, along with a suitable interface to connect to the BBU, D/A and ND conversion and basic processing capability. One of the remote radio heads 30, RRH 4, is shown in receive-only mode, in which there is no radio transmission. This RRH is in dormant mode and acts as a supplementary transmission unit which may be activated as required. In this embodiment, the baseband unit controls all of the RRHs and preconfigures them to activate and deactivate according to this configuration.

Figure 5:
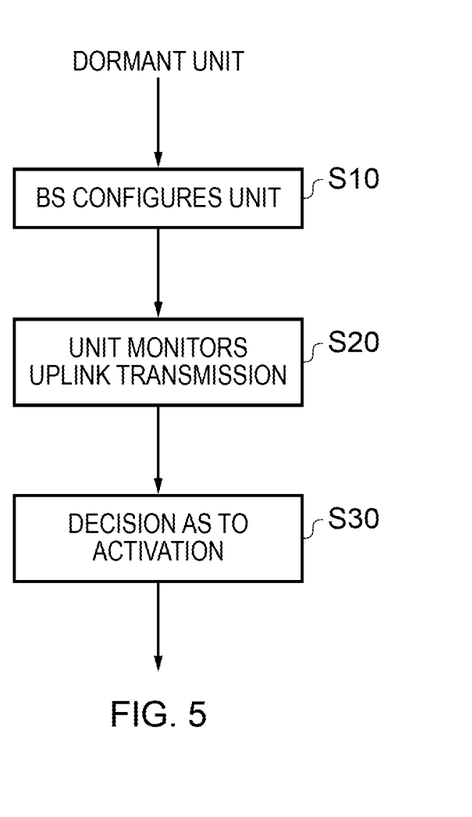
FIG. 5 is a flowchart of a general invention embodiment.

FIG. 5 is a basic flowchart of the steps of invention. A dormant supplementary transmission unit has been configured in step S10 and thus monitors uplink transmission in step S20. Decision as to activation of the dormant unit may be made in dependence upon this uplink transmission as monitored by the supplementary transmission unit in step S30. The method of monitoring and making a decision may be repeated periodically or on request until the unit is activated or the method comes to an end in some other way.

Low Power Devices

A primary use of the invention can be in waking up a suitable cell for a low power device.

In mobile communication systems, such as UMTS and LTE, before a mobile device can access the network, it needs to perform a random access procedure in order to synchronise with the base station and obtain a radio resource grant from the network for further access [see 3G PP TS36.321]. Typically a random access channel (RACH) is used during the random access procedure, in which more than one terminal can transmit in the same resources simultaneously (i.e. the Physical Random Access Channel (PRACH) of LTE [3G PP TS36.211]).

In LTE and UMTS networks, before the procedure can be initiated, the relating information is made available to the user devices via the downlink broadcast channel for the cell of interest [3G PP TS36.331]. This information may include the available set of PRACH resources for the transmission of the Random Access Preamble, the initial preamble power, the power-ramping factor, etc. The UE then selects and transmits an appropriate Random Access Preamble on the uplink of the selected cell with PREAMBLE_RECEIVED_TARGET_POWER as the transmit power. The Random Access procedure is successfully completed when the UE receives the RAR (Random Access Response) from the network (which contains an UL grant for further transmission).

Energy Saving Mode

Moreover, as explained previously, in order to achieve energy savings in a mobile communication network, one or more cells may enter energy saving mode when the traffic load is very low. Typically, there are cells providing basic coverage in the area, while capacity-booster cells may enter dormant mode in order to reduce power consumption.

Currently in 3GPP mobile communication systems, there are two basic approaches to dormancy control based on current 3GPP specifications to achieve energy savings. The first is an OAM-based (operations and management) approach, in which a cell enters or leaves dormant mode based on centralised OAM decisions that are made based on statistical information. The second is a signalling-based approach, in which cells may decide to enter dormant mode autonomously, while switch-on may be performed based upon requests from one or more neighbour nodes.

Figure 6:
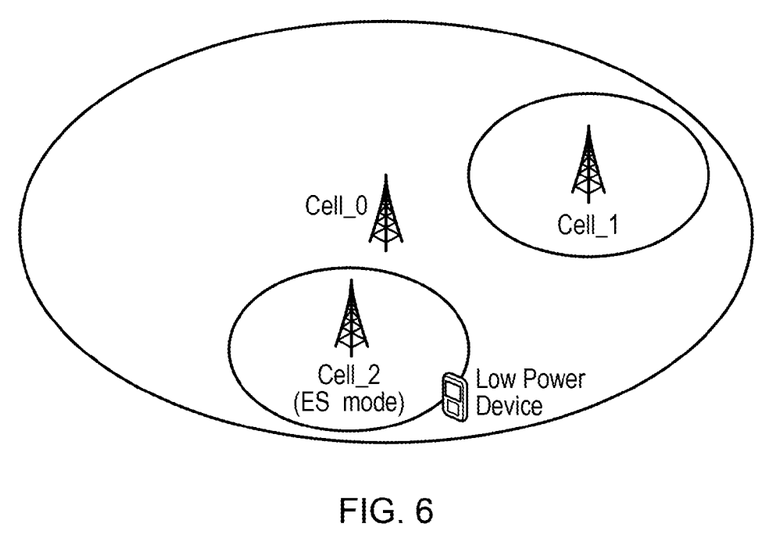
FIG. 6 is a schematic diagram illustrating the problem addressed in cell selection according to invention embodiments.

In systems such as LTE and UMTS, user devices with limited capabilities, i.e. low power devices, cannot always find the suitable cell for network services. FIG. 6 illustrates an example of the addressed problem. Cell_0 is currently active, and the low power device obtains the necessary system information, such as the relating settings for initial access for this cell. However, the required transmit power is beyond the capability of the low power device (i.e. maximum Tx power). Cell_2 in the area does not require high transmit power, but it is in energy saving ES mode (dormant mode).

The inventors have come to the realisation that, depending on the situation, it would be beneficial to activate Cell_2 in order to provide network services to the user devices with limited capability (e.g. low peak transmit power, or limited battery capacity). Invention embodiments may address one or more of the following questions:

How to find out that a low power device is trying to access the network?
How to decide which cell is most suitable cell to serve such devices?
How to activate, if required, the most suitable cell?

RACH Overview Embodiment

Invention embodiments enable dormant cells to monitor the random access (or other transmissions) of devices (such as low power devices) towards the neighbouring active cells based on request from the active cell(s) for measurements and reports on signals such as RACH and SRS. When applied to RACH, the overall scheme may consist of the following steps:
1. The active cell (e.g. Cell_0 in FIG. 6) sends a request to the dormant cell (e.g. Cell_2 in FIG. 6) for RACH measurements, in which the related context information is included, such as
   the available set of PRACH resources for the transmission of the Random Access Preamble
   a special set of preamble for low power devices (if available or configured)
   the initial preamble power,
   the power-ramping factor
   threshold for reporting the measurement
2. The dormant cell listens to the uplink transmission (towards the neighbouring active cell(s)) in the area.
3. When a low power device tries to access a neighbouring cell, the dormant cell monitors the uplink transmission on PRACH resources of the neighbour cell.
4. If the received power measurement of one of the relevant RACH preambles is above a certain threshold (e.g. the device is close enough to the dormant cell), the dormant cell sends the measurement to the neighbouring active cell that the low power device is trying to access.
5. Upon the receipt of the measurement, the active cell checks if the signal is stronger than its own measure. If so the active cell may activate the dormant cell to serve the low power device.

A similar procedure can be followed for transmission of other signals from a low power or other device (e.g. sounding reference signals, SRS or data or control transmission in the PUSCH or PUCCH channels).

Invention embodiments are suitable for inclusion in LTE specifications (in both 3GPP RAN2 and RAN3).

SPECIFIC EMBODIMENTS

In general, unless otherwise indicated, the embodiments described below may be based on LTE, where the network comprises multiple base stations (i.e. eNodeBs in LTE, and RNCs in UMTS), each controlling one or more downlink (DL) cells, each downlink cell having a corresponding uplink (UL) cell. Each DL cell may serve one or more user devices which may receive and decode signals transmitted in that serving cell.

In order for the user equipments (UEs) to perform initial access to the network, the eNodeB broadcasts the system information to the cell over downlink broadcast channel. Especially, the information random access can include the available set of PRACH resources for the transmission of the Random Access Preamble (which may include a special random access preamble group for specific purposes, such as supporting of low power user devices), the initial preamble power, the power-ramping factor, etc.

Following successful completion of the random access procedure other signals may be transmitted by the UE, for example sounding reference signals (SRS) for measuring the uplink channel from the UE to the base station.

Furthermore, for energy saving purposes some base stations (and the corresponding cells) may enter dormant mode when the traffic load is low, e.g. lower than a certain threshold. However, we assume that there are always base stations remaining on, in order to provide basic coverage. Typically, the pico cells which have been deployed in a network for capacity reasons can enter dormant mode when the traffic load is low. The macro cells provide the coverage in the area. Energy saving cells and coverage cells can operate at the same or different radio access technologies.

In addition, in the scenario where a BBU (base band unit) connects to multiple RRHs (remote radio head), one or more RRHs may enter dormant mode when the traffic load is low in the area.

Moreover, the case where each user device may be configured to have two or more serving cells at the same carrier frequency is not excluded from invention embodiments.

RACH Measurement Request

In this first specific RACH embodiment, the scenario shown in FIG. 6 is considered. Based on the current standard (3GPP TS36.423), the eNB that is controlling the dormant cell(s) informs the neighbouring eNB(s) when one or more of its cells enter dormant mode for energy saving purposes.

In this invention embodiment, the eNB (active eNB) that is controlling the active cell can send a request to the eNB (ES energy saving eNB) for example controlling the dormant cell(s), in which it asks the dormant cell(s) to monitor the random access activities toward the active cell(s). Corresponding information of the active cell(s) is provided in the request, such as an available set of PRACH resources for the transmission of the Random Access Preamble, the initial preamble power, the power-ramping factor, a received power threshold, etc Upon the acceptance of the request, the dormant cell then monitors the uplink PRACH transmissions according to the provided parameters. Thus, when a low power device performs initial access towards a neighbouring active cell, the dormant cell monitors and measures the uplink transmission from the device on PRACH resources. When PRACH transmission is received exceeding the threshold the dormant cell wakes-up.

In a variation of this embodiment a special random access preamble group is defined for a specific purpose, in this case for supporting low power user devices. A low power device is aware that it should use a preamble in the special group (e.g. because RACH access using normal preambles fails), or a signal is broadcast from the macro cell indicating that low power devices should use a special preamble group. The dormant cell then only monitors for preambles in the special group.

In a further variation of the embodiment the PRACH transmission for a low power device is in different resources (effectively at a different frequency band and/or time) from normal PRACH access. The dormant cell is requested to monitor for PRACH transmissions in these different resources.

RACH Measurement Reporting

A second specific RACH embodiment is like the first embodiment and also based on the scenario illustrated in FIG. 6. If any preconditions are met, for instance if the measurement is above a certain threshold (the device is close enough to the ES cell), instead of waking up immediately, the dormant cell sends the measurement report (or another indication of the measurement) to the neighbouring active cell that the low power device is trying to access. Additional information is also sent, to allow identification of the UE/uplink transmission for which the parameter is measured.

When the active cell receives the measurement, first of all it will check if there is such a device trying to access (that it can detect). If not, it is likely due to the reason that the transmit power of the device is too low and/or the device is too far away from the cell. In this case, the active cell may activate the ES cell to serve the low power device. Alternatively, the ES cell may leave dormant mode after a certain period during which the device performs several random access attempts with no success. This may be with or without instruction from the active cell.

If the active cell receives the preamble from the device, the active cell may compare the measure from the dormant cell with its own measure. If the signal received by the active cell itself is below a certain threshold and/or the signal received by the dormant cell is stronger than its own measure by a certain threshold (for example exceeds it by 3 dB or more), the active cell may activate the neighbouring dormant cell to serve the low power device.

As further variation of this embodiment, other considerations may be taken into account when the active cell decide to activate the dormant cell, such as the traffic load in the area, the speed of the low power device, the requested service from the low power device, etc. These considerations may influence the timing of the decision and/or the decision itself.

Waking Up a Suitable Cell to Serve the Low Power Device(s)

In a third specific RACH embodiment, otherwise similar to the second embodiment, multiple dormant cells overlap with the active cell. In this case, the active eNB may request multiple dormant cells to perform the RACH measurement.

In the case that multiple dormant cells report the RACH measurement of the same low power device, the active cell decide the most suitable cell to wake up based on, e.g. the received signal strength, and/or the capability of the dormant cells, and/or the requested services from the low power device, etc.

SRS Measurement and Reporting

A Sounding Reference Signal (SRS) embodiment is similar to the second specific RACH embodiment, but instead of PRACH the dormant cell is requested to receive SRS transmissions from the UE.

Figure 7:
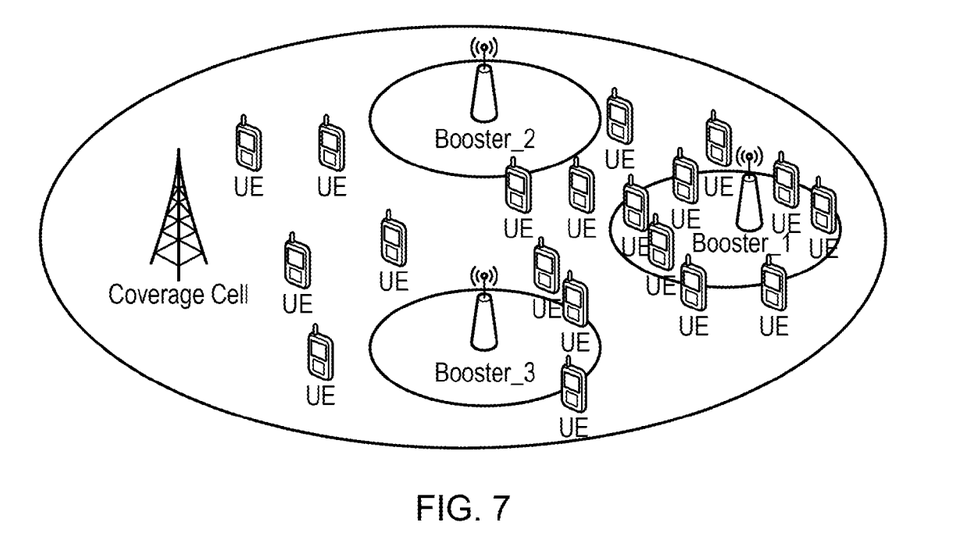
FIG. 7 is an example of an inter-eNB energy saving scenario as used in invention embodiments.

In addition to addressing the issue illustrated in FIG. 6, invention embodiments can be used as a solution to the issue shown in FIG. 7. The inter-eNB energy saving scenario is displayed in FIG. 7, in which LTE capacity booster cells (Booster_1, Booster_2 and Booster_3) are covered by the LTE coverage cell. Coverage Cell has been deployed to provide basic coverage, while the other cells boost the capacity. When some cells providing additional capacity are no longer needed, they may enter dormant mode for energy optimisation. In this case, both the continuity of LTE coverage and service QoS is guaranteed.

When the traffic load in the area increases to a certain threshold, the coverage cell needs to activate one or more capacity boosters. One issue here may be how to decide which cell(s) are most suitable to serve the traffic.

In this SRS embodiment, the eNB (active eNB) that is controlling the coverage cell can send a request to the eNB (ES eNB) that is controlling the dormant cell(s), in which it asks the dormant cell(s) to monitor the uplink transmissions toward the active cell(s). The corresponding information of the active cell(s) and the served UEs is provided in the request, such as details of the SRS signals transmitted, including timing.

Upon acceptance of the request, the dormant cell then monitors and measures the connected UEs' sound reference signal (SRS) in the uplink. If the measurement is above a certain threshold, the dormant cell sends the measurement report to the neighbouring active cell.

It is up to the coverage cell to decide if a dormant cell should be activated in order to serve extra traffic load in the area, based on e.g. the received signal strength, the requested services from the connected UEs, etc.

Activating a Receive-Only (RX Only) Remote Radio Head

In a further embodiment the active cell consists of a Base Band Unit (BBU) connecting to multiple RRHs and one or more RRHs are operating in Rx (receive) only mode for, e.g. energy saving reason when the traffic load is low in the area.

The Rx-only RRH(s) are configured to monitor the random access activities or other uplink transmissions in the area. Based on the first alternative and again using LTE as an example, when a low power device performs initial access towards the active cell, the Rx-only RRH monitors and measures the uplink transmission on PRACH resources. Based on the latter configuration, the Rx only RRH monitors and measures the active UEs' sound reference signal (SRS) in the uplink respectively.

It is up to the BBU to decide if the Rx only RRH should be activated in order to serve the low power device or extra traffic load, based on e.g. the received signal strength, the requested services from the low power device, etc.

SUMMARY

Some invention embodiments present a scheme intended to wake up a suitable cell to support devices with low transmit power; or to wake up a suitable cell to serve extra traffic load. This may be achieved by information exchange between the active cell and the dormant cell(s). The active cell configures the neighbour dormant cells to take RACH measurements, in particular for the low transmission power scenario or SRS measurements, in particular for capacity boosting, so that the dormant cells monitor the specific RACH activities/uplink transmission of the UEs in the active cell and report the measurements. Based on the measurement reports, the active cell is able to activate the appropriate dormant cell(s) in order to support specific user equipments, such as low power devices for or extra traffic load in the area.

In the RRH embodiments, the dormant RRH may be activated for the same two reasons, and activation may follow by instruction of the BBU.

SOME BENEFITS OF INVENTION EMBODIMENTS

The invention allows a 3GPP network, e.g. UMTS or LTE network, to be able to operate in energy saving mode, preferably while supporting user devices with limited capability, such as low transmit power. This can be achieved by enabling specific information exchange between the active cell and dormant cell(s) (or RRH and BBU).

Any of the embodiments and variations mentioned above may be combined in the same system. Whilst the above description has been made with respect to LTE and LTE-A, the present invention may have application to other kinds of wireless communication system also. Accordingly, references in the claims to "user equipment" are intended to cover any kind of subscriber station and are not restricted to the UE of LTE.

In any of the aspects or embodiments of the invention described above, the various features may be implemented in hardware, or as software modules running on one or more processors.

It is to be understood that various changes and/or modifications may be made to the particular embodiments just described without departing from the scope of the claims.

What is claimed is:

1. A telecommunications method in a wireless communication network comprising a base station, a supplementary transmission unit and one or more user equipments, the supplementary transmission unit being initially in a dormant state in which it does not transmit; wherein:
   based on a configuration received from the base station, the supplementary transmission unit measures a parameter of uplink transmission from the user equipment towards the base station;
   a decision is made as to whether to activate the supplementary transmission unit in dependence upon the measured parameter; and
   the supplementary transmission unit is activated if the base station does not receive the user equipment uplink transmission corresponding to the measured parameter of the user equipment uplink transmission at the supplementary transmission unit.

2. The method according to claim 1, wherein the decision as to whether to activate the supplementary transmission unit is made in the supplementary transmission unit and is based on a threshold of the parameter.

3. The method according to claim 1, wherein the supplementary transmission unit transmits an indication of the measured parameter at the supplementary transmission unit to the base station; and wherein the decision as to whether to activate the supplementary transmission unit is made in the base station.

4. The method according to claim 3, wherein the indication is only transmitted if the measured parameter satisfies at least one precondition.

5. The method according to claim 3, wherein if user equipment uplink transmission corresponding to the measured parameter at the supplementary transmission unit is received at the base station, the decision as to whether to activate the supplementary transmission unit is made on the basis of a comparison between the indication of the measured parameter at the supplementary transmission unit and the same parameter of user equipment uplink transmission, but measured at the base station.

6. The method according to claim 3 wherein the network includes more than one supplementary transmission unit, and the base station selects a supplementary transmission unit to activate based on the indications from the different supplementary transmission units.

7. The method according to claim 1, wherein the user equipment uplink transmission is transmission as part of an access procedure to access the network.

8. The method according to claim 7, wherein the user equipment uplink transmission is of a predefined access signal reserved for certain user devices, preferably of a random access preamble designated for use by low power devices and/or transmitted in resources designated for use by low power devices.

9. The method according to claim 1, wherein the user equipment uplink transmission is transmission for measuring an uplink channel from the user equipment to the base station, or transmission of uplink control information or uplink data transmission.

10. The method according to claim 1, wherein the base station requests the dormant supplementary transmission unit to carry out the measurement of user equipment uplink transmission at the start of the method; and preferably wherein the base station request includes information related to uplink transmission settings in a cell provided by the base station.

11. The method according to claim 1, wherein
   the base station is a base station providing a cell and the supplementary transmission unit is a booster base station providing a booster cell overlapping with the cell when activated, or a relay station, providing a relaying cell overlapping with the cell when activated, or wherein
   the base station is a baseband unit with at least one remote radio head in receive and transmit mode and the supplementary transmission unit is a remote radio head of the base band unit which is in receive-only mode when dormant.

12. A wireless communication network comprising a base station, a supplementary transmission unit and one or more user equipments, the supplementary transmission unit having a dormant state in which it does not transmit; wherein:
   the supplementary transmission unit is operable in dormant mode to measure a parameter of uplink transmission from the user equipment towards the base station;
   a controller is operable to make a decision whether to activate the supplementary transmission unit in dependence upon the measured parameter; and
   the supplementary transmission unit is activated if the base station does not receive the user equipment uplink transmission corresponding to the measured parameter of the user equipment uplink transmission at the supplementary transmission unit.

13. A base station in a wireless communication network comprising the base station, a supplementary transmission unit and one or more user equipments, the supplementary transmission unit having a dormant state in which it does not transmit but can measure a parameter of uplink transmission from the user equipment towards the base station; wherein:

the base station is operable to receive an indication of the measured parameter from the supplementary transmission unit; and to decide whether to activate the supplementary transmission unit; and wherein the supplementary transmission unit is activated if the base station does not receive the user equipment uplink transmission corresponding to the measured parameter of the user equipment uplink transmission at the supplementary transmission unit.

14. A supplementary transmission unit in a wireless communication network comprising a base station, the supplementary transmission unit and one or more user equipments, the supplementary transmission unit having a dormant state in which it does not transmit; wherein:

the supplementary transmission unit is operable in dormant mode to measure a parameter of uplink transmission from the user equipment towards the base station; and the supplementary transmission unit is activated if the base station does not receive the user equipment uplink transmission corresponding to the measured parameter of the user equipment uplink transmission at the supplementary transmission unit.

15. A user equipment in a wireless communication network comprising a base station, a supplementary transmission unit and one or more user equipments, the supplementary transmission unit having a dormant state in which it does not transmit; wherein the user equipment is configured to:

transmit uplink towards the base station using transmission resources and/or a signal which distinguishes it from user equipments of another class of device; and wherein the supplementary transmission unit is activated if the base station does not receive the user equipment uplink transmission corresponding to the measured parameter of the user equipment uplink transmission at the supplementary transmission unit.

* * * * *